Patented Nov. 6, 1945

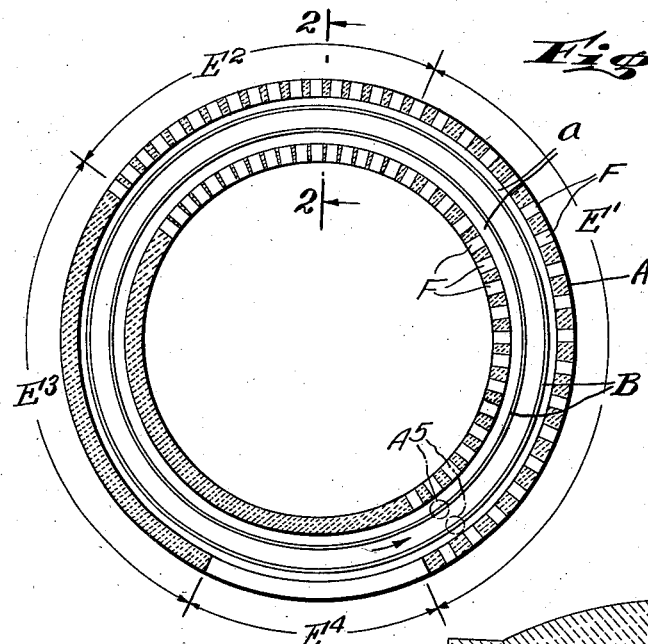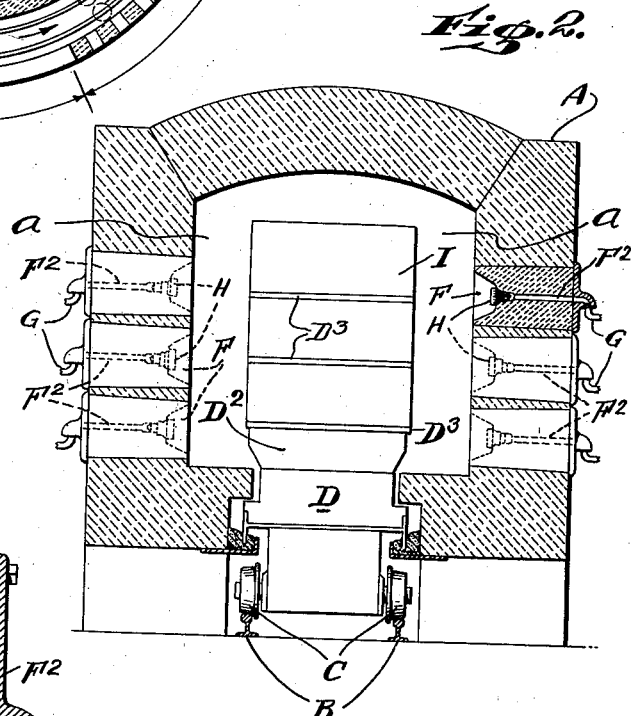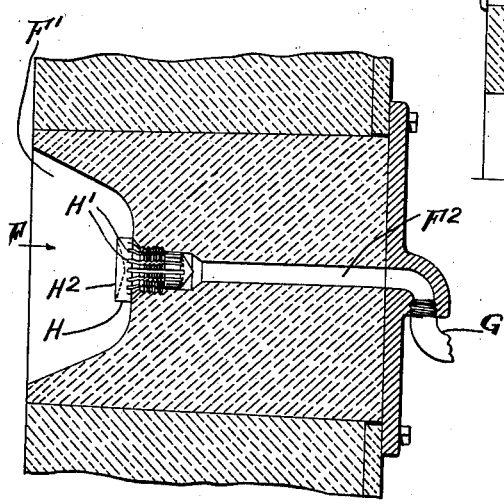

2,388,611

UNITED STATES PATENT OFFICE 2,388,611

METHOD OF FORMING VITREOUS COATINGS

Frederic O. Hess, Germantown, Pa., assignor to Selas Corporation of America, a corporation of Pennsylvania Application May 16, 1941, Serial No. 393,804

6 Claims. (Cl. 117—125)

The general object of the present invention is to provide an improved method of forming vitreous surface coatings and the invention is of especial utility in glazing ceramic wares and in enamelling metallic wares, and may also be employed in certain glass annealing operations in the course of which surface portions of the articles annealed are converted into molten glass films.

A specific object of the invention is to heat a furnace chamber used in glazing ceramic articles, or in enamelling metallic articles, by a direct firing operation which permits the maintenance in the portion of the chamber containing the articles to be coated, of an enveloping atmosphere suitable for the coating operation without requiring the enclosure of the articles coated in saggers.

In coating ceramic articles with glaze and in coating metallic articles with enamel, each article is initially covered with suitable coat forming materials, usually in the form of a paste, and is then heated to the temperature at which said materials fuse and form a molten glass-like film on the articles, after which the article is cooled to solidify and harden the coating. While the coat forming materials are approaching and are being maintained at the fusing temperature, vaporization of some of the glaze forming constituents occurs. Morever, unless the articles being coated are then enveloped in an atmosphere suitably saturated with vapors of the vaporizable, glaze forming constituents, the vaporization of the latter will be sufficient to deprive the glaze or enamel coating formed of desirable properties which it would otherwise possess. Such depletion of vaporizable coating constituents is avoided when the partial vapor pressures in the atmosphere or layer of gas enveloping the articles and immediately adjacent to the coatings are large fractions of the equilibrium pressures of said constituents as there will then be no significant net loss of vaporizable constituents from the coating on the article to the enveloping atmosphere.

Furthermore, the character of the glaze or enamel coating formed may be adversely affected not only by the omission from the enveloping atmosphere or layer of gas immediately adjacent thereto of essential constituents, but also by the inclusion in said atmosphere of injurious constituents, the nature of which depends somewhat on the character and desirable composition of the vitreous coating formed. While some oxygen in the enveloping atmosphere is generally desirable, an excess of oxygen is generally undesirable. In general, also, the inclusion in the article enveloping atmosphere of significant amounts of harmful constituents of the products of combustion is undesirable, and the inclusion of even a minute quantity of sulphur gases formed by incomplete combustion of fuel gas containing sulphur may have highly prejudicial results. As will be apparent, in enamelling or glazing articles in an open furnace chamber heated by direct firing, the furnace atmosphere in which the articles are disposed must be maintained practically quiescent to avoid dilution of the vapors of vaporizable coating materials and to avoid the inclusion of undesirable constituents in the layer of gas immediately adjacent to the coating materials. Heretofore the proper enveloping atmosphere for articles being glazed or enamelled has been maintained by enclosing the articles in saggers, or by carrying out the coating operation in furnace chambers heated electrically or by muffle heating means.

In the use of the present invention the furnace chamber in which the articles are glazed or enamelled, is heated by a direct firing method characterized by the direct radiation to the articles of most of the heat liberated by the combustion of the fuel used. Said method is further characterized by the movement of the combustion gases through the furnace chamber along such paths and with such relatively low velocity that the gases do not mix with or disturb to any significant extent the portion of the atmosphere in said chamber directly enveloping and immediately adjacent to the surfaces of the articles coated, although no partition is interposed between said paths and said articles.

In accordance with the present invention the furnace chamber is heated by the combustion of gaseous fuel at relatively high combustion temperatures in combustion spaces formed in the refractory furnace chamber wall or in refractory portions thereof and opening directly to the furnace chamber. Preferably, the gaseous fuel employed is a combustible mixture of air and gas and is passed into each combustion space in the form of a multiplicity of small jets so distributed alongside the refractory wall of the combustion space that the combustion of the jets heats the refractory wall to incandescence, and all of the combustible mixture supplied to each combustion space is substantially completely burned at a region closely adjacent to and in the immediate vicinity of the space or zone. This insures the attainment of relatively high combustion chamber temperatures, and in consequence of the high temperatures of the burning jets and their proximity to the refractory combustion space wall, complete efficient combustion is effected and a relatively large portion of the heat liberated is radiated directly into the furnace chamber from the incandescent wall of the combustion space of each burner and from the burning gases in said space.

In the practical use of my invention I may advantageously make use of burner of a commercial type and form disclosed in my prior Patent No. 2,215,079, and mounted in the walls of the furnace in the general manner illustrated in said patent and in my related Patents Nos. 2,215,080 and 2,215,081, all of said patents having been granted September 17, 1940.

In the use of my improved method of heating a glost or metallic enamelling furnace, it is readily practical to make use of such a multiplicity of furnace wall burners so located and distributed as to insure a highly desirable distribution of the heat radiated directly to the wares being coated from the combustion space of the burners. The heat distribution thus made possible is of the utmost importance in glazing ceramic wares in which the application of heat must be regulated not only with reference to the immediate requirements of the glaze forming operation, but also to avoid appreciable differences between temperatures of the different portions of an individual article coated and to avoid unduly rapid changes in the temperature of said articles.

The relatively large proportion of the heat liberated which is radiated directly to the articles coated, the relatively small volume of heating gases passing into the furnace chamber proper from each of the numerous combustion spaces in the furnace wall and the relatively low velocities of those gases, all contribute to the quiet movement of the heating gases through the furnace chamber to one or more suitably located heating gas outlets without significant admixture of the heating gases with, or objectionable agitation of the vapor containing atmosphere enveloping and immediately adjacent to the surfaces of the articles being coated.

Vitreous films may be produced on articles in accordance with my invention in heating chambers of furnaces and kilns of very different types and forms, and in particular in heating chambers of furnaces and kilns of the intermittent type and of the continuous type. By way of illustration and example, and not by way of limitation, I have illustrated in the accompanying drawing a continuous kiln which has been successfully used in glazing high grade porcelain table ware in accordance with the present invention.

Of the drawing:

Fig. 1 is a diagrammatic plan view;

Fig. 2 is a section taken on the line 2—2 of Fig. 1; and

Fig. 3 is a partial section taken similarly to Fig. 2, but on a larger scale showing burner parts in greater detail.

The kiln A shown diagrammatically in Fig. 1 is of circular type, comprising a circular track B on which run the wheels C of a goods carrier which may comprise a plurality of kiln cars D connected together to form a slowly moving train. The kiln comprises a kiln chamber $a$ including a preheating section $E'$, a firing section $E^2$ and a cooling section $E^3$ in end to end relation. Between the preheating and cooling section ends of the kiln chamber is an open loading and unloading section $E^4$. For the glost firing of ceramic articles in a kiln of the type shown, the preheating section $E'$ may well be appreciably longer than the cooling section $E^3$, and the high temperature or heating section $E^2$ in which glaze forming action is effective, may well be appreciably shorter than the cooling section $E^3$ and appreciably longer than the loading section $E^4$.

As shown, the furnace chamber $a$ is substantially rectangular in cross section except that its roof is in the form of an arch, as is customary. The goods carrier may be formed by kiln cars of conventional form, as shown, in that each comprises a superstructure formed with transverse passages $D^2$ immediately beneath a work supporting platform $D^3$. The passages $D^2$ are open at their ends and have their lower edges at approximately the level of the bottom wall of the furnace chamber $a$.

The burners F mounted in the side walls of the furnace chamber $a$ are shown as each comprising a body portion of refractory material formed at its furnace chamber side with a combustion zone or space $F'$ into which combustible mixture is passed by external piping G through an axial passage $F^2$ formed in said body and through peripheral orifice grooves $H'$ formed in and extending longitudinally of a burner tip member H. The latter is a ceramic body of refractory material having a head portion $H^2$ in the combustion space $F'$ of the burner and a body portion of reduced cross section extending into and secured in the adjacent end of the passage $F^2$. The orifice grooves $H'$ are shaped and disposed to discharge jets distributed about the burner axis and inclined away from the burner axis and toward the furnace chamber at about the same angle as the adjacent portion of the combustion space wall surface, so that the burning jets will extend alongside of and will not impinge against said wall surface. In respect to its features, illustrated and described hereinbefore, the burner and burner mounting need not differ in type or form from those shown in my above mentioned prior patents.

In the firing section $E^2$ of the kiln, shown in Fig. 2, the burners F are shown as located at three different levels, the burners at each level being suitably distributed along the length of said zone. As will be apparent, the number and location of the burners may vary widely with the kiln dimensions and conditions of use. Merely for the purpose of illustration, therefore, and not by way of limitation, I note that in one kiln of the construction shown in the drawing, which has been successfully used in glost firing high grade porcelain table ware, the lengths of the preheating firing cooling and loading sections were respectively 46, 26, 36 and slightly less than 18 feet, each section being measured along its center line; and the car loading space I was 30 inches wide and 36 inches high and spaced 12 inches away from the side of the kiln chamber A and about 6 inches below the top of the chamber.

In the firing zone of said kiln there were 66 burners arranged in three tiers as shown in Fig. 2. In the kiln being referred to, half of the 66 burners were located at the lower level directly opposite the upper portions of the channels $D^2$ and the lower portions of the car load, 23 of the burners were located at a level approximately one foot higher than the level of the bottom burners and the remaining 10 burners were arranged at a level about 2 feet above the bottom and one foot below the top of the load space I. In the preheating section of the kiln, 34 burners were installed, all at approximately the level of the lower burners shown in Fig. 2. Also by way of illustration and example, and not by way of limitation, I note that in operating said kiln, the glost firing cycle was such that the time required for the movement of a single piece of ware through the preheating, firing, and cooling zones or sections of the kiln was about 28 hours, but could have been reduced. The glost firing temperature maintained in the final portion of the firing section $E^2$ of the kiln was about 1950° F.

In the operation of the kiln being referred to and like that shown in the drawing and dimensioned and operated as above described, the products of combustion moved out of the burner combustion zones or spaces F' with relatively low velocities and moved through the chamber A to the heating gas outlets $A^5$ located adjacent the inlet end of the preheating section E' along flow paths between the kiln loading space I and the enclosing wall of the chamber and did not interfere with the maintenance immediately adjacent to the ware of an enveloping atmosphere in the loading space of a character determined primarily by the vapors of the vaporizable glazing materials with which the wares were coated prior to their introduction into the kiln. In consequence of the influx of air at the ends of the kiln chamber and particularly at the exit ends of the cooling section $E^3$, the furnace atmosphere was definitely and advantageously slightly oxidizing. Convection current circulation of the kiln atmosphere, which is essential for the heat distribution purposes in ordinary muffle heated furnaces, is not required to insure proper heat distribution in the firing section $E^2$ of the kiln illustrated, since heat distribution therein is obtained as a result of the radiation of heat directly to the wares from the suitably distributed burner combustion zones or spaces. The apparatus shown in the drawing can be used without change for different uses. In coating small articles the cars may be provided with superposed work supports $D^3$, while in handling larger articles only the lowermost support $D^3$ is required. While the kiln shown in the drawing can be used without change for enamelling metallic wares, the lower maximum temperatures required for heating and cooling the wares and for fusing the enamel forming materials permits a very substantial shortening of the time cycle of the kiln.

As those skilled in the art will understand, the invention is adapted for use for enamelling and glazing operations in which the maximum operating temperature varies from about 1325° F. at which the vitreous enamel can be formed on steel, up to a temperature of about 2650° F. required in the production of porcelain wares by the method in which the ware body is formed and glazed in a single furnace operation. In the production of many types of ceramic wares, however, the glazing operation is effected at a temperature which is something like 100° to 200° F. lower than the bisque firing operation to which ware bodies had been previously subjected. The invention is adapted for use, also, with any of the numerous glazing material compositions customarily employed and which vary in accordance both with the glazing character and appearance desired and with the glazing temperature which the character of the ware glazed makes appropriate.

The invention is desirably characterized by the fact that its use permits of directing radiant heat against the article to be heated and a localization of particular portions of the article to which major portions of the radiant heat are desirably directed.

I have found by tests of commercial forms of apparatus that when subjected to maximum load conditions, the velocity of gas flow away from the burner of the character shown in Fig. 3, measured at a distance of one foot from the burner is about one per cent, or less, of the similarly measured velocity of gas flow away from a burner of the general type heretofore in general and extensive use in heating a furnace chamber by the combustion of gas within the chamber.

The present invention may be used with advantage in certain glass annealing operations in which heat may advantageously be transmitted to the articles annealed rapidly enough to melt or soften the glass and produce smooth glass films on the surfaces of the articles. In practice such molten glass films are sometimes subject to disadvantageous "bloom" or surface disfiguring action when the article is heated in the usual manner by the combustion of gas within the annealing chamber. I have found that the same gas may be used to effect heating of glass in annealing chambers in accordance with the method disclosed herein without creating such "bloom" effects. I attribute this to the fact that the "bloom" effects referred to are due to the presence in the products of combustion of harmful sulphur gases formed by the incomplete combustion of sulphur in the gas. With substantially complete combustion and the slow movement of the products of combustion obtained in the use of the method disclosed herein, the likelihood of creating bloom effects is avoided.

While in accordance with the provisions of the statutes, I have illustrated and described the best forms of embodiment of my invention now known to me, it will be apparent to those skilled in the art that changes may be made in the form of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent is:

1. In the art of producing articles having a vitreous surface film, the improvement which comprises applying to an article a coating of non-vitreous material which fuses when heated and is converted to a vitreous film, placing the coated article in a space from which gases may pass, subjecting the article while in the space to radiant heat including heat radiated from a plurality of incandescent zones spaced from each other and to which the coating is exposed, so as to heat the coating to a predetermined high temperature in the neighborhood of 1325° F. or higher and produce a vitreous film, burning combustibles in the space to heat the zones to incandescence, the burned products of combustion formed in the space encompassing the article and augmenting the heating of the article by the radiant heat, and burning the combustibles substantially completely in regions closely adjacent to and in the immediate vicinities of the zones and supplying the combustibles to the zones at a rate to heat the coating to the predetermined high temperature and cause the burned products of combustion to flow from the zones and through the space and pass therefrom at a low velocity which will not appreciably disturb the layer of gas immediately adjacent the coating, so that any adverse effect tending to result from the reaction of any constituent of the burned products of combustion with the coating will be insufficient to impair the smooth and lustrous surface formed on the vitreous film.

2. In the art of producing articles having a vitreous surface film, the improvement which comprises applying to an article a coating of non-vitreous material which fuses when heated and is converted to a vitreous film, placing the coated article in a space from which gases may pass, subjecting the article while in the space to radiant heat including heat radiated from a plurality of incandescent zones spaced from each other and to which the coating is exposed, so as to heat the coating to a predetermined high temperature in the neighborhood of 1325° F. or higher and produce a vitreous film, burning combustibles in the space to heat the zones to incandescence, the burned products of combustion formed in the space encompassing the article and augmenting the heating of the article by the radiant heat, the heating of the article causing a vaporous layer to form which is immediately adjacent and overlies the surface of the coating and consists predominantly of vapors expelled from the coating, and burning the combustibles substantially completely in regions closely adjacent to and in the immediate vicinities of the zones and supplying the combustibles to the zones at a rate to heat the coating to the predetermined high temperature and cause the burned products of combustion to flow from the zones and through the space and pass therefrom at a low velocity which will not appreciably disturb the affinity or tension between the coating and the vaporous layer immediately adjacent thereto, so that any adverse effect tending to result from the reaction of any constituent of the burned products of combustion with the coating will be insufficient to impair the smooth and lustrous surface formed on the vitreous film.

3. In the art of producing articles having a vitreous surface film, the improvement which comprises applying to an article a coating of non-vitreous material which fuses when heated and is converted to a vitreous film, placing the coated article in a space from which gases may pass, subjecting the article while in the space to radiant heat including heat radiated from a plurality of incandescent zones spaced from each other and to which the coating is exposed, so as to heat the coating to a predetermined high temperature in the neighborhood of 1325° F. or higher and produce a vitreous film, burning combustibles in the space to heat the zones to incandescence, the burned products of combustion formed in the space encompassing the article and augmenting the heating of the article by the radiant heat, and subdividing the combustibles at the zones into a plurality of small streams which may be burned substantially completely in regions closely adjacent to and in the immediate vicinity of the zones and supplying the combustibles to the zones at a rate to heat the coating to the predetermined high temperature and cause the burned products of combustion to flow from the zones and through the space and pass therefrom at a low velocity which will not appreciably disturb the layer of gas immediately adjacent the coating, so that any adverse effect tending to result from the reaction of any constituent of the burned products of combustion with the coating will be insufficient to impair the smooth and lustrous surface formed on the vitreous film.

4. In the art of forming a smooth and lustrous vitreous film on articles having surfaces which may be fused when heated to high temperatures to produce such a film, the improvement which comprises placing such an article in a space from which gases may pass, subjecting the article while in the space to radiant heat including heat radiated from a plurality of incandescent zones spaced from each other and to which the article is exposed, so as to heat the surface to a predetermined high temperature in the neighborhood of 1325° F. or higher and produce a smooth vitreous film, burning combustibles in the space to heat the zones to incandescence, the burned products of combustion formed in the space encompassing the article and augmenting the heating of the article by the radiant heat, and burning the combustibles substantially completely in regions closely adjacent to and in the immediate vicinities of the zones and supplying the combustibles to the zones at a rate to heat the surface to the predetermined high temperature and cause the burned products of combustion to flow from the zones and through the space and pass therefrom at a low velocity which will not appreciably disturb the layer of gas immediately adjacent the surface of the article, so that any adverse effect tending to result from the reaction of any constituent of the burned products of combustion with the surface will be insufficient to impair the smooth and lustrous surface of the vitreous film.

5. In the art of producing glazed porcelain table ware, the improvement which comprises applying to such table ware a coating of non-vitreous material which fuses when heated and is converted to a vitreous film having a glazed surface, placing the coated table ware in a space from which gases may pass, subjecting the table ware while in the space to radiant heat including heat radiated from a plurality of incandescent zones spaced from each other and to which the coating is exposed, so as to heat the coating to a predetermined high temperature in the neighborhood of 1950° F. or higher and produce a vitreous film, burning combustibles in the space in regions closely adjacent to and in the immediate vicinities of the zones to heat the latter to incandescence and avoid flame impingement of the table ware, the burned products of combustion formed in the space encompassing the table ware and augmenting the heating of the latter by the radiant heat, and supplying the combustibles to the zones at a rate to heat the coating to the predetermined temperature and cause the burned products of combustion to flow from the zones and through the space and pass therefrom at a low velocity which will not appreciably disturb the layer of gas immediately adjacent the coating, so that any adverse effect tending to result from the reaction of any constituent of the burned products of combustion with the coating will be insufficient to impair the smooth and lustrous surface formed on the vitreous film.

6. In the art of producing glazed porcelain table ware in a continuous tunnel kiln, the improvement which comprises applying to such table ware a coating of non-vitreous material which fuses when heated and is converted to a vitreous film having a glazed surface, moving the coated table ware through a kiln from which gases may pass, subjecting the table ware during movement through the kiln to radiant heat including heat radiated from a plurality of incandescent zones spaced from each other and to which the coating is exposed, so as to heat the coating to a predetermined high temperature in the neighborhood of 1950° F. or higher and produce a vitreous film, burning combustibles in the space in regions closely adjacent to and in the immediate vicinities of the zones to heat the latter to incandescence and avoid flame impingement of the table ware, the burned products of combustion formed in the kiln encompassing the table ware and augmenting the heating of the latter by the radiant heat, and supplying the combustibles to the zones at a rate to heat the coating to the predetermined temperature and cause the burned products of combustion to flow from the zones and through the kiln and pass therefrom at a low velocity which will not appreciably disturb the layer of gas immediately adjacent the coating, so that any adverse effect tending to result from the reaction of any constituent of the burned products of combustion with the coating will be insufficient to impair the smooth and lustrous surface formed on the vitreous film.

FREDERIC O. HESS.